United States Patent
Noguchi et al.

(10) Patent No.: US 9,865,413 B2
(45) Date of Patent: Jan. 9, 2018

(54) VEHICLE CONTROL DEVICE

(71) Applicant: HONDA MOTOR CO., LTD., Tokyo (JP)

(72) Inventors: Junpei Noguchi, Utsunomiya (JP); Shinichi Arie, Utsunomiya (JP); Masayuki Yamazaki, Utsunomiya (JP); Tomonori Watanabe, Utsunomiya (JP); Masayuki Habaguchi, Utsunomiya (JP); Kentaro Yoshimura, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 14/684,281

(22) Filed: Apr. 10, 2015

(65) Prior Publication Data
US 2016/0300672 A1  Oct. 13, 2016

(51) Int. Cl.
| | | |
|---|---|---|
| B60L 1/00 | (2006.01) |
| B60L 3/00 | (2006.01) |
| H02G 3/00 | (2006.01) |
| H01H 13/50 | (2006.01) |
| B60R 16/023 | (2006.01) |

(52) U.S. Cl.
CPC .......... *H01H 13/50* (2013.01); *B60R 16/023* (2013.01); *H01H 2215/03* (2013.01); *H01H 2231/026* (2013.01); *H01H 2300/054* (2013.01)

(58) Field of Classification Search
CPC ............. H01H 13/50; H01H 2300/054; H01H 2231/026; H01H 2215/03; B60R 16/023
See application file for complete search history.

(56) References Cited

U.S. PATENT DOCUMENTS

| | | | | |
|---|---|---|---|---|
| 2003/0225493 A1* | 12/2003 | Patterson | .......... | B60R 21/01512 701/45 |
| 2009/0033150 A1 | 2/2009 | Ko et al. | | |
| 2009/0164062 A1* | 6/2009 | Aoki | .................... | B60Q 1/0082 701/36 |

(Continued)

FOREIGN PATENT DOCUMENTS

| | | |
|---|---|---|
| JP | 2002-178795 | 6/2002 |
| JP | 2007-187031 | 7/2007 |

(Continued)

OTHER PUBLICATIONS

Japanese Office Action dated Aug. 22, 2017 with English Translation, 8 pages.

*Primary Examiner* — Jared Fureman
*Assistant Examiner* — Esayas Yeshaw
(74) *Attorney, Agent, or Firm* — Rankin, Hill & Clark LLP

(57) ABSTRACT

In a switching control device of a vehicle control device, when a vehicle is in a non-traveling condition, an operating method for a pressing operation, which is carried out with respect to a push switch in relation to a switching control for switching an operating state of a drive source of the vehicle or a power supply state to a vehicle mounted device of the vehicle, in a case that the operating state of the drive source of the vehicle or the power supply state to the vehicle mounted device of the vehicle is switched from off to on, differs from an operating method for a pressing operation in a case that the operating state or the power supply state is switched from on to off.

10 Claims, 10 Drawing Sheets

(56) References Cited

U.S. PATENT DOCUMENTS

| | | | |
|---|---|---|---|
| 2009/0195231 A1* | 8/2009 | Noon | H02M 3/156 323/282 |
| 2010/0090526 A1* | 4/2010 | Itou | F02N 11/0814 307/10.6 |
| 2010/0100295 A1* | 4/2010 | Inoue | B60W 10/06 701/69 |
| 2013/0066507 A1 | 3/2013 | Yamane et al. | |
| 2014/0001869 A1* | 1/2014 | Czarnecki | H02J 3/006 307/80 |
| 2014/0350827 A1* | 11/2014 | Mukaihara | F02N 11/0844 701/113 |
| 2015/0219214 A1* | 8/2015 | Kawamoto | B60W 30/18027 701/51 |

FOREIGN PATENT DOCUMENTS

| | | |
|---|---|---|
| JP | 2008-001317 | 1/2008 |
| JP | 2008-201146 | 9/2008 |
| JP | 2009-029408 | 2/2009 |
| JP | 2009-123434 | 6/2009 |
| JP | 2010-112257 | 5/2010 |
| WO | 2011/142203 | 11/2011 |

* cited by examiner

FIG. 3

| | SITUATION | OPERATION | | OPERATION SOUND |
|---|---|---|---|---|
| 1 | START ENGINE WHILE VEHICLE IS STATIONARY (SHIFT POSITION: P) | | BRAKE PEDAL ON AND PRESS SSSW FOR SHORT TIME | |
| 2 | STOP ENGINE WHILE VEHICLE IS STATIONARY (SHIFT POSITION: P) | ENGINE START STOP | PRESS SSSW FOR LONG TIME | Pi |
| 3 | EMERGENCY STOP OF ENGINE DURING TRAVELING | ENGINE START STOP | PRESS SSSW FOR VERY LONG TIME OR PREDETERMINED NUMBER OF TIMES IN SUCCESSION | Pi |
| 4 | SWITCHING FROM VEHICLE OFF STATE TO ACC ON STATE WHILE VEHICLE IS STATIONARY | ENGINE START STOP | PRESS SSSW FOR SHORT TIME | |
| 5 | SWITCHING FROM ACC ON STATE TO VEHICLE ON STATE WHILE VEHICLE IS STATIONARY | ENGINE START STOP | PRESS SSSW FOR SHORT TIME | |
| 6 | SWITCHING FROM VEHICLE ON STATE TO VEHICLE OFF STATE WHILE VEHICLE IS STATIONARY | ENGINE START STOP | PRESS SSSW FOR LONG TIME | Pi |
| 7 | INTERRUPTION OF ENGINE START WHILE VEHICLE IS STATIONARY | → ENGINE START STOP | (1) BRAKE PEDAL ON AND PRESS SSSW FOR SHORT TIME → ENGINE ON (2) PRESS SSSW FOR LONG TIME → INTERRUPTION | Pi |
| 8 | INTERRUPTION OF ENGINE START DURING RELEASE OF IDLE STOP | ENGINE START STOP | PRESS SSSW FOR LONG TIME | Pi |

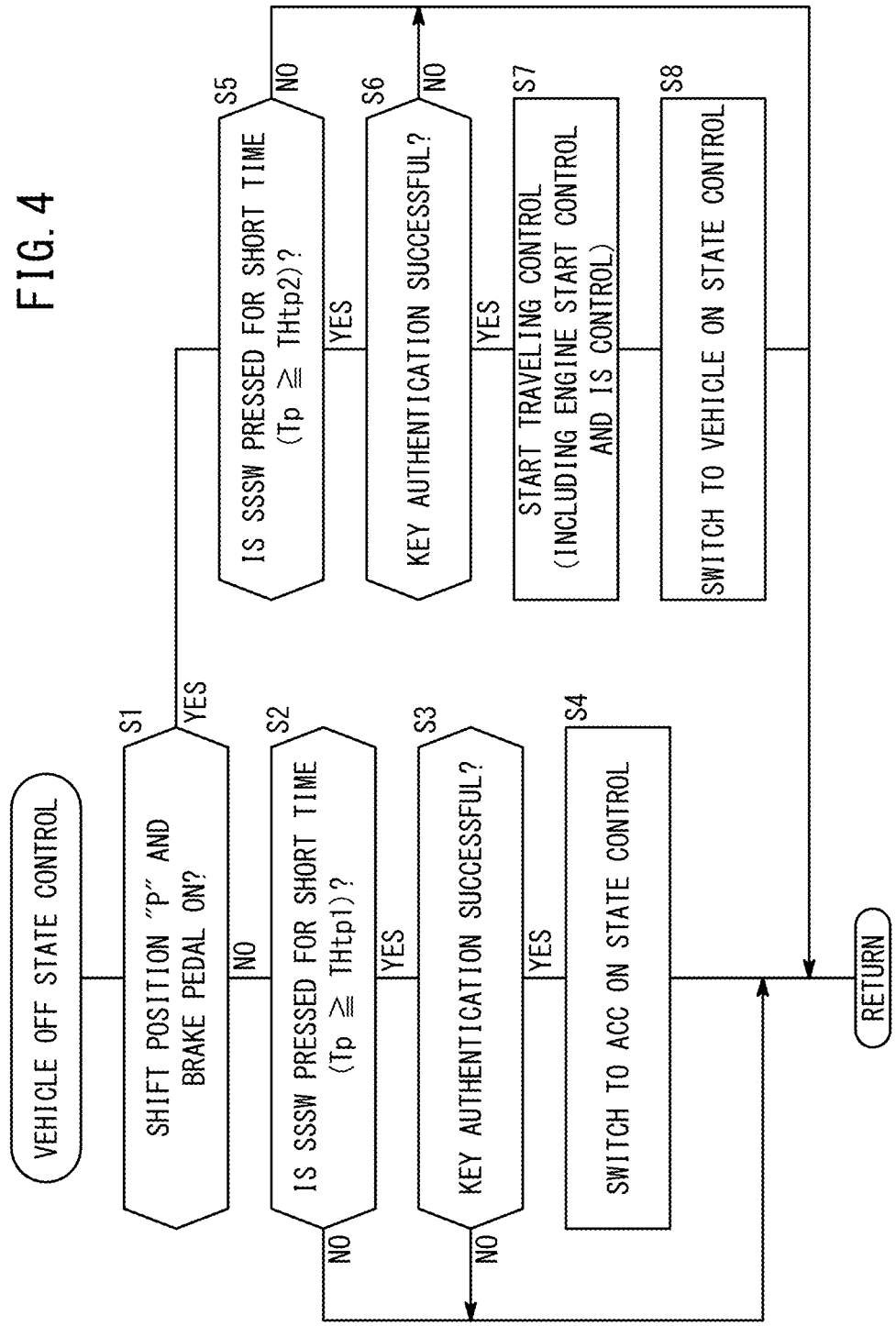

VEHICLE CONTROL DEVICE

BACKGROUND OF THE INVENTION

Field of the Invention

The present invention relates to a vehicle control device for switching an operating state of a drive source of a vehicle or a power supply state to a vehicle mounted device, corresponding to a pressing operation performed with respect to a push switch.

Description of the Related Art

According to International Publication No. WO2011/142203 (hereinafter referred to as "WO2011/142203A1"), a vehicle control device is disclosed in which, using a push-type engine start/stop switch 16 (SSSW 16), switching is carried out between a start control and a stop control of an engine 30 and related devices. By the start control, the engine 30 and related devices are turned on by a pressing operation (on operation) of the SSSW 16 (see, paragraphs [0037] to [0038]). Further, by the stop control, the engine 30 and related devices are turned off by a pressing operation (off operation) of the SSSW 16 (see, FIG. 3 and paragraphs [0039] to [0054]).

SUMMARY OF THE INVENTION

According to the disclosure of WO2011/142203A1, no consideration is given concerning the relationship or association between the on operation and the off operation of the SSSW 16.

The present invention has been devised taking into consideration the problems mentioned above, and has the object of providing a vehicle control device, in which ease of operation of a push switch can be enhanced by efficiently associating an on operation and an off operation of the push switch.

A vehicle control device according to the present invention includes a push switch disposed in an interior of a vehicle and on which a pressing operation can be performed by an occupant, and a switching control device that performs a switching control for switching an operating state of a drive source of the vehicle or a power supply state to a vehicle mounted device of the vehicle, corresponding to a pressing operation carried out with respect to the push switch.

With the vehicle control device, in a case that the vehicle is in a non-traveling condition, the switching control device causes an operating method for the pressing operation, which is carried out with respect to the push switch for effecting the switching control, in a case that the drive source or the vehicle mounted device of the vehicle is switched from off to on, to be different from an operating method for the pressing operation in a case that the drive source or the vehicle mounted device of the vehicle is switched from on to off.

According to the present invention, when the vehicle is in a non-traveling condition, the operating method by the push switch differs in the case that the drive source or the vehicle mounted device of the vehicle is switched from off to on, from the operating method by the push switch in the case that the drive source or the vehicle mounted device is switched from on to off. Therefore, even though both the on operation and the off operation are carried out by way of a pressing operation with respect to the commonly used push switch, it is required for the vehicle occupant to perform intentionally different operations by the on operation and the off operation. Consequently, with the present invention, the occurrence of mistaken operations performed with respect to the push switch can be reduced.

The switching control device may set an operation confirmation time of the push switch in the case that the drive source or the vehicle mounted device of the vehicle is switched from on to off to be longer than an operation confirmation time of the push switch in the case that the drive source or the vehicle mounted device of the vehicle is switched from off to on. Consequently, while ensuring operability of the on operation, by making it more difficult to turn off the power source by a mistaken operation in relation to the off operation, convenience can be enhanced together with preventing the occurrence of mistaken operations.

The vehicle control device may comprise a sound generating device that produces a sound responsive to operation of the push switch. The switching control device may cause the sound to be produced by the sound generating device in the case that the drive source or the vehicle mounted device of the vehicle is switched from on to off.

For example, in the case that the vehicle occupant operates the push switch by mistake when stopping the engine by an idle stop while the vehicle is stationary, a condition may be contemplated in which the power source of the vehicle is turned off. Even if such a condition occurs, in accordance with the configuration described above, the fact that the vehicle occupant has performed an operation to turn off the power source can be recognized, and therefore, such an erroneous operation is easily noticed.

In the case that the drive source or the vehicle mounted device of the vehicle is switched from on to off, the switching control device may cause the sound to be produced by the sound generating device when operation of the push switch is finalized. In accordance with this feature, inconvenience is reduced as compared to generating the sound before the operation of the push switch is finalized, and it is also possible to securely notify the vehicle occupant that the off operation has been performed.

Another switch on which a pressing operation can be performed may be disposed in the vicinity of the push switch. In this case, the push switch may be arranged farther from the occupant who is seated in a driver's seat than the other switch in a longitudinal direction of the vehicle. Thus, in accordance with this feature, even though the other switch exists, which is similar to the push switch in the vicinity of the push switch, the possibility for a mistaken operation of the push switch can further be reduced.

The push switch may be arranged at a position that can be viewed on an inner side of a steering wheel that is mounted in the vehicle, from perspective of the occupant who is seated in a driver's seat. The other switch may be arranged at a position that can be viewed on an outer side of the steering wheel, from the perspective of the occupant who is seated in the driver's seat. Thus, in accordance with this feature, even though the other switch exists, which is similar to the push switch in the vicinity of the push switch, the possibility for a mistaken operation of the push switch can further be reduced.

The push switch and the other switch may be of different colors on surfaces thereof that are viewed by the occupant. Thus, in accordance with this feature, even though the other switch exists, which is similar to the push switch in the vicinity of the push switch, the possibility for a mistaken operation of the push switch can further be reduced.

The other switch may be a hazard switch configured to illuminate a hazard lamp of the vehicle. The surface color of the hazard switch may be red, and the surface color of the push switch may be a color other than red. In accordance with this feature, by providing the hazard switch, which has a high possibility of being operated during traveling, with a prominent color (red), the possibility for mistaken operation of the push switch during traveling of the vehicle can further be reduced.

The vehicle control device may comprise a notification device that notifies the occupant concerning the operation method of the push switch responsive to the operation that is carried out with respect to the push switch. In a case that the push switch is operated when the drive source or the vehicle mounted device of the vehicle is on, the switching control device may notify to the notification device the operation method for switching the drive source or the vehicle mounted device of the vehicle from on to off. Owing thereto, the operation method is made clear even to a vehicle occupant who is not familiar with operation of the push switch, thus enhancing convenience to the occupant.

When a shift position of the vehicle is in park, the switching control device may set an operation confirmation time of the push switch to be the same in the case that the drive source or the vehicle mounted device of the vehicle is switched from off to on, and in the case that the drive source or the vehicle mounted device of the vehicle is switched from on to off. When the shift position of the vehicle is not in park, the switching control device may set the operation confirmation time of the push switch in the case that the drive source or the vehicle mounted device of the vehicle is switched from on to off to be longer than the operation confirmation time of the push switch in the case that the drive source or the vehicle mounted device of the vehicle is switched from off to on.

If the shift position is set to park, it can be assumed that there is a high possibility for the user to intentionally perform the off operation. Therefore, as noted above, it is possible to ensure operability in such a situation.

When a parking brake is on, the switching control device may set an operation confirmation time of the push switch to be the same in the case that the drive source or the vehicle mounted device of the vehicle is switched from off to on, and in the case that the drive source or the vehicle mounted device of the vehicle is switched from on to off. When the parking brake is not on, the switching control device may set the operation confirmation time of the push switch in the case that the drive source or the vehicle mounted device of the vehicle is switched from on to off to be longer than the operation confirmation time of the push switch in the case that the drive source or the vehicle mounted device of the vehicle is switched from off to on.

If the parking brake is on, it can be assumed that there is a high possibility for the user to intentionally perform the off operation. Therefore, as noted above, it is possible to ensure operability in such a situation.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a view showing an example of a situation in which an engine start/stop switch (hereinafter referred to as an "SSSW") is operated, and the operation as well as an operation sound of the SSSW in the present embodiment;

FIG. 4 is a flowchart of a vehicle off state control in the present embodiment;

DESCRIPTION OF THE PREFERRED EMBODIMENTS

A. Embodiment

[A1. Description of Overall Configuration]
(A1-1. Overall Configuration)

Figure 1:
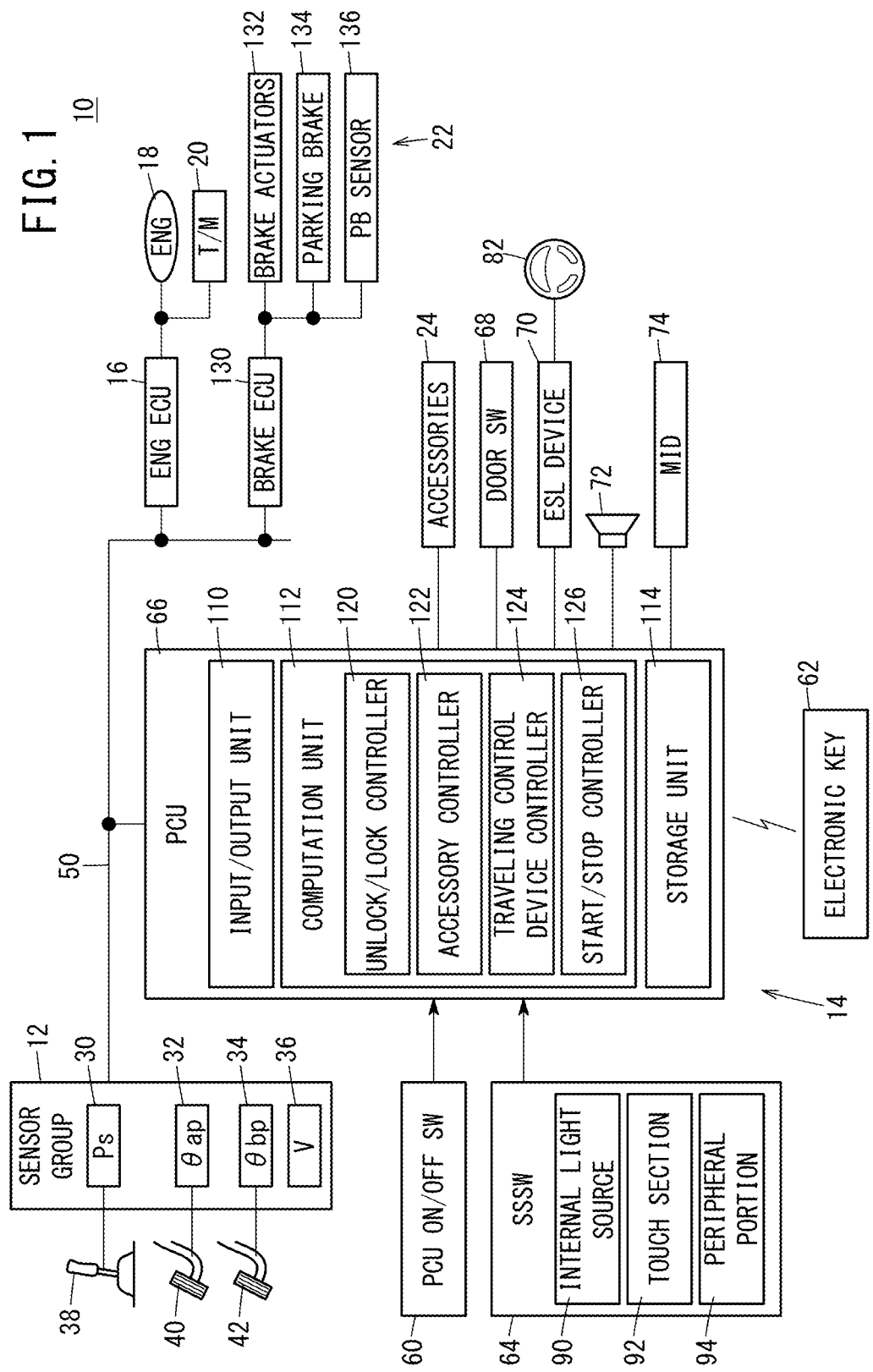
FIG. 1 is a block diagram of a vehicle incorporating therein a vehicle control device according to an embodiment of the present invention.
Figure 2:
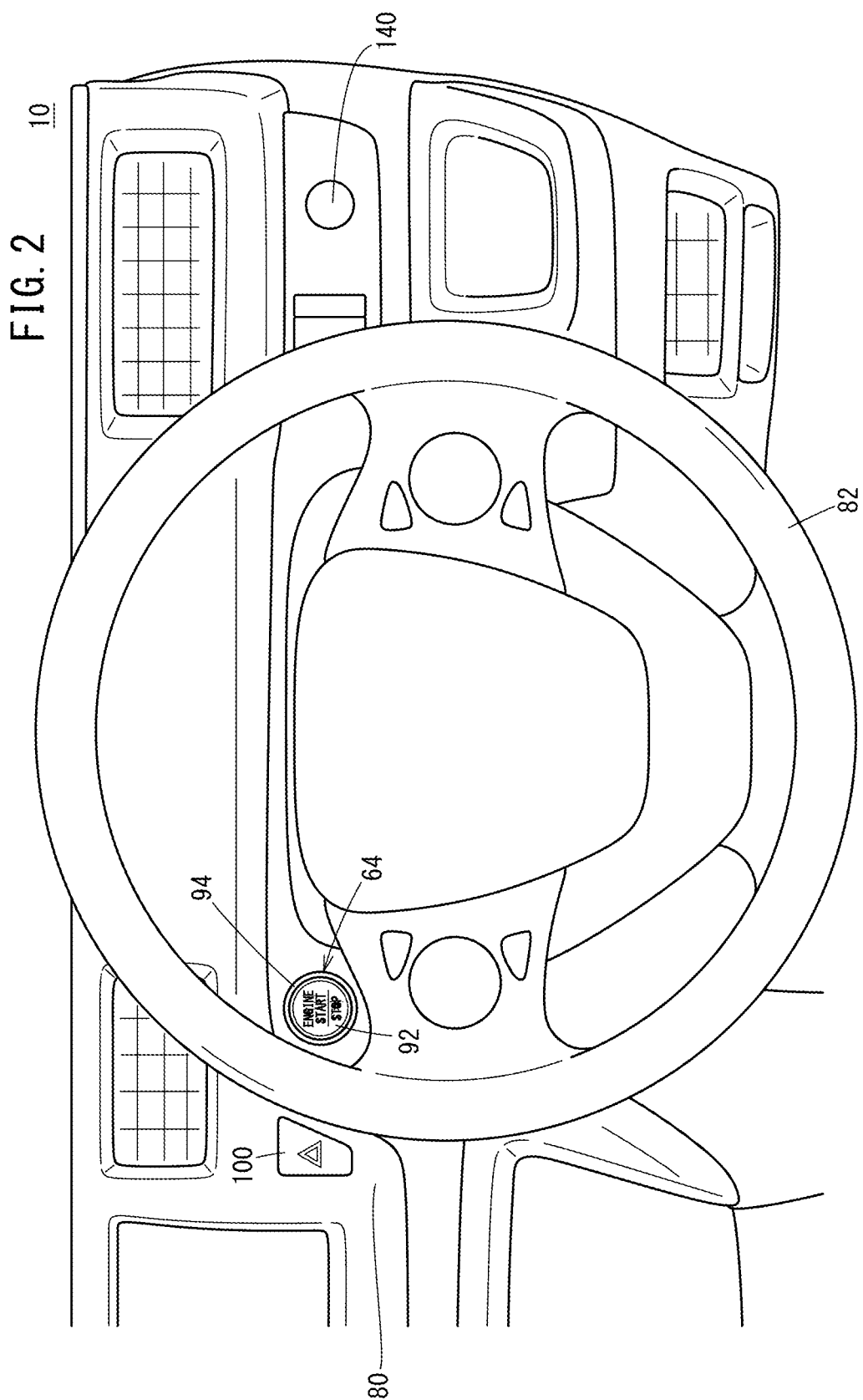
FIG. 2 is a view showing part of a vehicle interior of the vehicle in the present embodiment.

FIG. 1 is a block diagram of a vehicle 10 incorporating therein a vehicle control device 14 (hereinafter also referred to as a "control device 14") according to an embodiment of the present invention. FIG. 2 is a view showing part of a vehicle interior of the vehicle 10 in the present embodiment. The vehicle 10 comprises a gasoline vehicle, for example. Alternatively, the vehicle 10 may be a diesel engine vehicle or an electric vehicle (including a hybrid vehicle and a fuel cell vehicle).

The vehicle 10 is equipped with a smart entry function and a smart start function. In addition to the vehicle control device 14, the vehicle 10 includes a sensor group 12, an engine electronic control unit 16 (hereinafter referred to as an "engine ECU 16" or "ENG ECU 16"), an engine 18 (drive source), a transmission 20, a brake system 22, and accessories 24.

(A1-2. Sensor Group 12)

In the sensor group 12, there are included a shift position sensor 30 (hereinafter also referred to as a "sensor 30"), an accelerator pedal sensor 32 (hereinafter also referred to as an "AP sensor 32" or a "sensor 32"), a brake pedal sensor 34 (hereinafter also referred to as a "BP sensor 34" or a "sensor 34"), and a vehicle velocity sensor 36 (hereinafter also referred to as a "sensor 36").

The shift position sensor 30 detects the position of a shift lever 38. The AP sensor 32 detects an operation amount θap of an accelerator pedal 40 (hereinafter also referred to as an "AP operation amount θap"). The BP sensor 34 detects an operation amount θbp of a brake pedal 42 (hereinafter also referred to as a "BP operation amount θbp"). The vehicle velocity sensor 36 detects the vehicle velocity V [km/h] of the vehicle 10. Detection values of each of the sensors 30, 32, 34, 36 are output through a communication line 50 to the vehicle control device 14, the engine ECU 16, etc.

(A1-3. Vehicle Control Device 14)
(A1-3-1. Outline Description)

The vehicle control device 14 implements a switching control for controlling an operating condition of the engine 18 (drive source) of the vehicle 10, and the power source supply condition to various vehicle mounted devices (ENG ECU 16, accessories 24, etc.). The vehicle control device 14 is equipped with a PCU on/off switch 60 (hereinafter also referred to as an "on/off SW 60"), an electronic key 62, an engine start/stop switch 64 (hereinafter also referred to as an "SSSW 64", where SSSW implies a start/stop switch), a power control unit 66 (hereinafter referred to as a "PCU 66"), a door switch 68, an electric steering lock device 70 (hereinafter referred to as an "ESL device 70"), a speaker 72, and a multi-information display 74 (hereinafter referred to as a "MID 74").

(A1-3-2. PCU on/Off Switch 60)

The on/off SW 60 is a switch for selectively turning the vehicle control device 14 (or the PCU 66) on and off. Normally, the on/off SW 60 is kept on.

(A1-3-3. Electronic Key 62)

The electronic key 62 is a portable key, which is used for authenticating operations when the vehicle 10 is started. The electronic key 62 establishes wireless communications with the PCU 66, and transmits an authentication code responsive to a request from the PCU 66.

(A1-3-4. SSSW 64)

The SSSW 64 is a push (pressing) type of switch which, responsive to an operation of a user (vehicle occupant), switches an operating condition of the engine 18 and a power source supply condition to the vehicle mounted devices (ENG ECU 16, accessories 24, etc.). Further details of such switching operations will be described later with reference to FIG. 3, etc.

As shown in FIG. 2, the SSSW 64 is arranged on a dash board 80 at a position to the left of and behind a steering wheel 82. Further, as shown in FIG. 1, the SSSW 64 includes an internal light source 90, a touch section 92, and a peripheral portion 94. The internal light source 90 emits light with a relatively conspicuous color (e.g., red). In addition, the internal light source 90 can also emit light of a color (e.g., white) that differs from the relatively conspicuous color. The touch section 92 is of a color that differs from that of the interior light source 90 (e.g., black, orange, yellow, yellow-green, green, blue, purple or white). Cutout lettering reading "ENGINE START/STOP" is provided on the surface of the touch section 92. Further, the peripheral portion 94 is formed from a translucent material (e.g., a transparent material). Therefore, when the internal light source 90 emits light, the user can view the light from the internal light source 90 through the peripheral portion 94 and the cutout portion of the touch section 92.

Furthermore, the SSSW 64 of the present embodiment is disposed more on a rearward side (toward the front of the vehicle 10) than a hazard switch 100 that causes flashing of a non-illustrated hazard lamp. Stated otherwise, the SSSW 64 is arranged farther from a user who is seated in a driver's seat than the hazard switch 100 in the longitudinal direction of the vehicle 10. Thus, even though the hazard switch 100 exists, which is similar to the SSSW 64 in the vicinity of the SSSW 64, the possibility for a mistaken operation of the SSSW 64 can be reduced.

Moreover, the hazard switch 100 is arranged at a position that can be viewed on an outer side of the steering wheel 82 from the perspective of an occupant who is seated in the driver's seat, whereas the SSSW 64 is arranged at a position that can be viewed on an inner side of the steering wheel 82 from the perspective of the occupant who is seated in the driver's seat.

(A1-3-5. PCU 66)

As shown in FIG. 1, the PCU 66 includes, as hardware components thereof, an input/output unit 110, a computation unit 112, and a storage unit 114. The input/output unit 110 serves to carry out input and output of information between the PCU 66 and other devices, and contains a non-illustrated wireless transmission device. The computation unit 112, along with controlling the vehicle control device 14 overall, also serves to control the engine ECU 16 and the brake system 22. The computation unit 112 includes an unlock/lock controller 120 (hereinafter also referred to as a "controller 120"), an accessory controller 122, a traveling control device controller 124, and a start/stop controller 126 (hereinafter also referred to as a "controller 126").

The unlock/lock controller 120 controls unlocking and locking of doors, not shown. More specifically, the controller 120 performs an authenticating process based on wireless communications with the electronic key 62. If the controller 120 successfully authenticates the electronic key 62, then the controller 120 allows the doors to be unlocked. Further, if a predetermined action is made on a button (not shown) on one of the doors, or if a given period of time elapses after no wireless communications have taken place between the controller 120 and the electronic key 62, then the controller 120 locks the doors.

The accessory controller 122 controls on and off operations of accessories 24 responsive to an operation of the SSSW 64 performed by the user. The traveling control device controller 124 controls on and off operations of a traveling control device responsive to an operation of the SSSW 64 performed by the user. The traveling control device in this case is a device for carrying out a control in relation to traveling of the vehicle 10, and for example, includes the ENG ECU 16 and a brake electronic control unit 130 of the brake system 22.

The start/stop controller 126 controls starting and stopping of the engine 18 (or operation of the engine ECU 16). More specifically, during step S7 of FIG. 4, step S16 of FIG. 5, or step S39 of FIG. 6, as will be described later, a traveling control process in the engine ECU 16 is initiated by the start/stop controller 126, and the engine 18 is started.

Further, while the engine ECU 16 carries out the traveling control, when a predetermined operation is applied from the user with respect to the SSSW 64, the start/stop controller 126 terminates the traveling control operation, and the engine 18 is completely stopped. Consequently, even in the case that the vehicle 10 is currently traveling, the vehicle 10 is stopped (or the engine 18 is stopped even though the engine 18 is currently under operation), and transitions to a vehicle off state (to be described in detail later with reference to FIGS. 6 and 7).

(A1-3-6. Other Features)

The door switch 68 detects opening and closing of a non-illustrated door. In order to prevent the vehicle 10 from being stolen, the ESL device 70 locks the steering wheel 82 against rotation when the vehicle 10 is turned off (during a vehicle off state).

The speaker 72 outputs a sound (operation sound) responsive to operation of the SSSW 64. The speaker 72 may double as a speaker for a non-illustrated audio device (part of the accessories 24), for example. The MID 74 is a display device that is disposed within a non-illustrated instrument panel. The display area thereof is smaller and the number of pixels thereof are fewer than those of a monitor that is used for a navigation device (part of the accessories 24), for example.

(A1-4. Engine ECU 16)

The engine ECU 16 executes the traveling control by controlling the drive power (stated otherwise, the output of the engine 18) of the vehicle 10 corresponding to the AP operation amount θap, the vehicle velocity V, etc. As will be described later, starting and stopping of the traveling control is triggered by a command from the PCU 66. An engine start control and an idle stop control (hereinafter also referred to as an "IS control") are included in the traveling control.

The engine start control includes a cranking control by which the crankshaft (not shown) is rotated to bring about ignition, and an ignition control for igniting the engine 18. The IS control is a control for placing the engine 18 in an idle stop, if a predetermined idle stop condition for stopping the engine 18 is satisfied (e.g., the vehicle velocity V is decelerated to or below a vehicle velocity threshold THv). Moreover, in the case that the vehicle 10 is a hybrid vehicle equipped with a traction motor in addition to the engine 18, under the IS control, even assuming that the idle stop condition is satisfied, if the remaining capacity of a high-voltage battery is less than or equal to a given threshold, the engine 18 may be driven for the purpose of generating power.

(A1-5. Brake System 22)

The brake system 22 includes a brake electronic control unit 130 (hereinafter referred to as a "brake ECU 130"), brake actuators 132, a parking brake 134, and a parking brake sensor 136 (hereinafter also referred to as a "PB sensor 136"). The brake ECU 130 controls the brake actuators 132 (braking devices) that are disposed on the respective wheels responsive to the BP operation amount θbp or the like. The brake ECU 130 carries out a vehicle stability assist (VSA) control, for example.

The VSA control includes an antilock braking control for preventing the road wheels from becoming locked during braking, a traction control to prevent the road wheels from undergoing idle rotation during acceleration, and a side-slip suppression control for suppressing lateral slippage when the vehicle makes a turn. Further, the brake ECU 130 activates the parking brake 134 when the shift position Ps is "P" (park). The PB sensor 136 detects whether or not the parking brake 134 is operating normally.

(A1-6. Accessories 24)

The accessories 24, for example, include an audio device and a navigation device. The accessories 24 are controlled so as to be turned on and off by the vehicle control device 14.

[A2. Switching Control]

(A2-1. Summary)

Next, a description will be given concerning the switching control that is implemented by the vehicle control device 14 of the present embodiment. In the switching control, through operations performed by the user on the SSSW 64, the operating state of the engine 18 and the power supply state to the vehicle mounted devices (the engine ECU 16, the brake ECU 130, the accessories 24, etc.) are controlled. More specifically, in the switching control, a "vehicle off state" (OFF), an "accessory on state" (ACC), and a "vehicle on state" (ON) are switched.

The vehicle off state is a state in which the entire vehicle 10, including the vehicle mounted devices (excluding certain exceptions), is turned off. The accessory on state (hereinafter also referred to as an "ACC on state") is a state in which the vehicle mounted devices are turned on. The vehicle on state is a state in which the vehicle 10 is traveling or is being driven. However, the phrase "traveling or is being driven" includes a situation (e.g., an idle stop condition) in which, although the vehicle 10 is stopped (i.e., the vehicle velocity V is zero), the vehicle 10 is capable of moving by the user operating the accelerator pedal 40.

In the following description, the control performed by the PCU 66 in the vehicle off state will be referred to as a "vehicle off state control", the control performed by the PCU 66 in the ACC on state will be referred to as an "accessory on state control" or an "ACC on state control", and the control performed by the PCU 66 in the vehicle on state will be referred to as a "vehicle on state control".

According to the present embodiment, the method for operating the SSSW 64 required for switching from the vehicle off state control to the ACC on state control or the vehicle on state control, and the method for operating the SSSW 64 required for switching from the vehicle on state control to the vehicle off state control, differ from each other. As operating methods, for example, there may be included the pressing time Tp [sec] of the SSSW 64, and the pressing times Np [number of times] that the SSSW 64 is pressed.

FIG. 3 is a view showing an example of a situation in which the SSSW 64 is operated, and the operation as well as an operation sound of the SSSW 64 in the present embodiment. The respective examples of FIG. 3 will be described in conjunction with the flowcharts of FIGS. 4 through 7.

(A2-2. Vehicle Off State Control)

FIG. 4 is a flowchart of a vehicle off state control in the present embodiment. In step S1, the PCU 66 judges whether or not the shift position Ps is "P" based on an output from the shift position sensor 30, and further judges whether or not the brake pedal 42 is on in accordance with an output from the BP sensor 34. Whether the brake pedal 42 is on is determined by whether or not the BP operation amount θbp exceeds a predetermined BP operation amount threshold THθbp. In the case that the shift position Ps is not "P" or the brake pedal 42 is not on (step S1: NO), then the process proceeds to step S2. Judgment of the shift position Ps may also determine whether the shift position Ps is "P" or "N".

In step S2, the PCU 66 judges whether or not the SSSW 64 has been pressed for a short time interval. More specifically, a judgment is made as to whether or not the pressing time Tp of the SSSW 64 is greater than or equal to a first time threshold THtp1 (hereinafter also referred to as a "first threshold THtp1" or a "threshold THtp1"). The first threshold THtp1 is a threshold value for determining that the SSSW 64 has been pressed for a short time, and for example, can be of any value from 10 to 90 milliseconds.

If the SSSW 64 has been pressed for a short time (step S2: YES), then in step S3, the PCU 66 judges whether or not authentication (key authentication) with the electronic key 62 is successful. If key authentication was successful (step S3: YES), then in step S4, the PCU 66 switches (situation 4 of FIG. 3) from the vehicle off state control to the ACC on state control (see FIG. 5). If the SSSW 64 has not been pressed for a short time (step S2: NO) or key authentication was unsuccessful (step S3: NO), the current process is terminated, and the process returns to step S1.

In step S1, if the shift position Ps is "P" and the brake pedal 42 is on (step S1: YES), then in step S5, the PCU 66 judges whether or not the SSSW 64 has been pressed for a short time. More specifically, a judgment is made as to whether or not the pressing time Tp of the SSSW 64 is greater than or equal to a second time threshold THtp2 (hereinafter also referred to as a "second threshold THtp2" or a "threshold THtp2"). The second threshold THtp2 is a threshold value for determining that the SSSW 64 has been pressed for a short time, and for example, can be of any value from 10 to 90 milliseconds. The second threshold THtp2 may be the same length as the first threshold THtp1, or may be a different length than the first threshold THtp1.

If the SSSW 64 has been pressed for a short time (step S5: YES), then in step S6, the PCU 66 judges whether or not authentication (key authentication) with the electronic key 62 is successful. If key authentication was successful (step S6: YES), then in step S7, the PCU 66 initiates the traveling control by which the vehicle 10 is made to travel, and starts the engine 18 (situation 1 of FIG. 3). In the foregoing manner, within the traveling control, there are included an engine start control for starting the engine 18, and an idle stop (IS) control for placing the engine 18 in an idle stop when certain predetermined conditions are satisfied.

Figure 6:
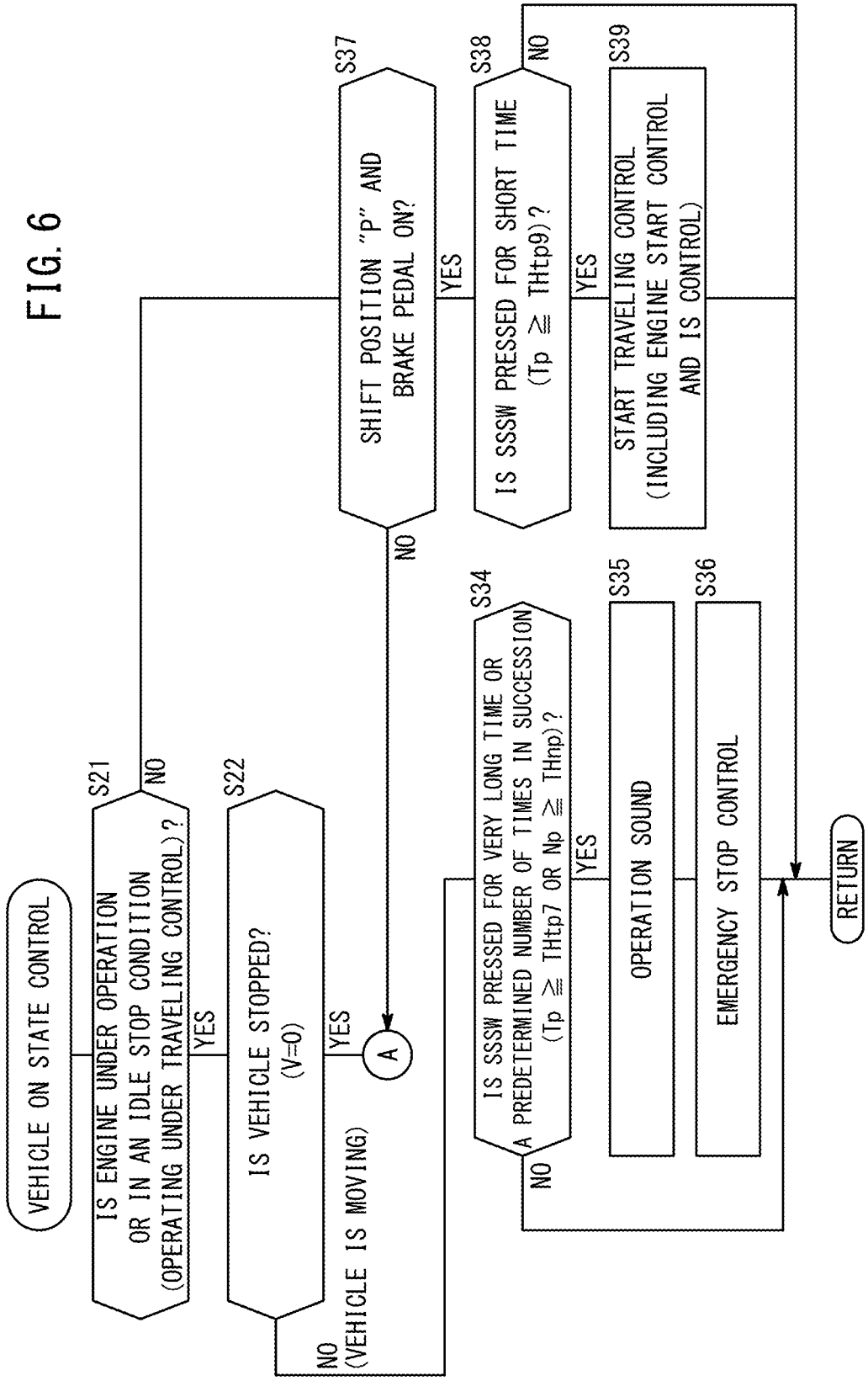
FIG. 6 is a first flowchart of a vehicle on state control in the present embodiment.
Figure 7:
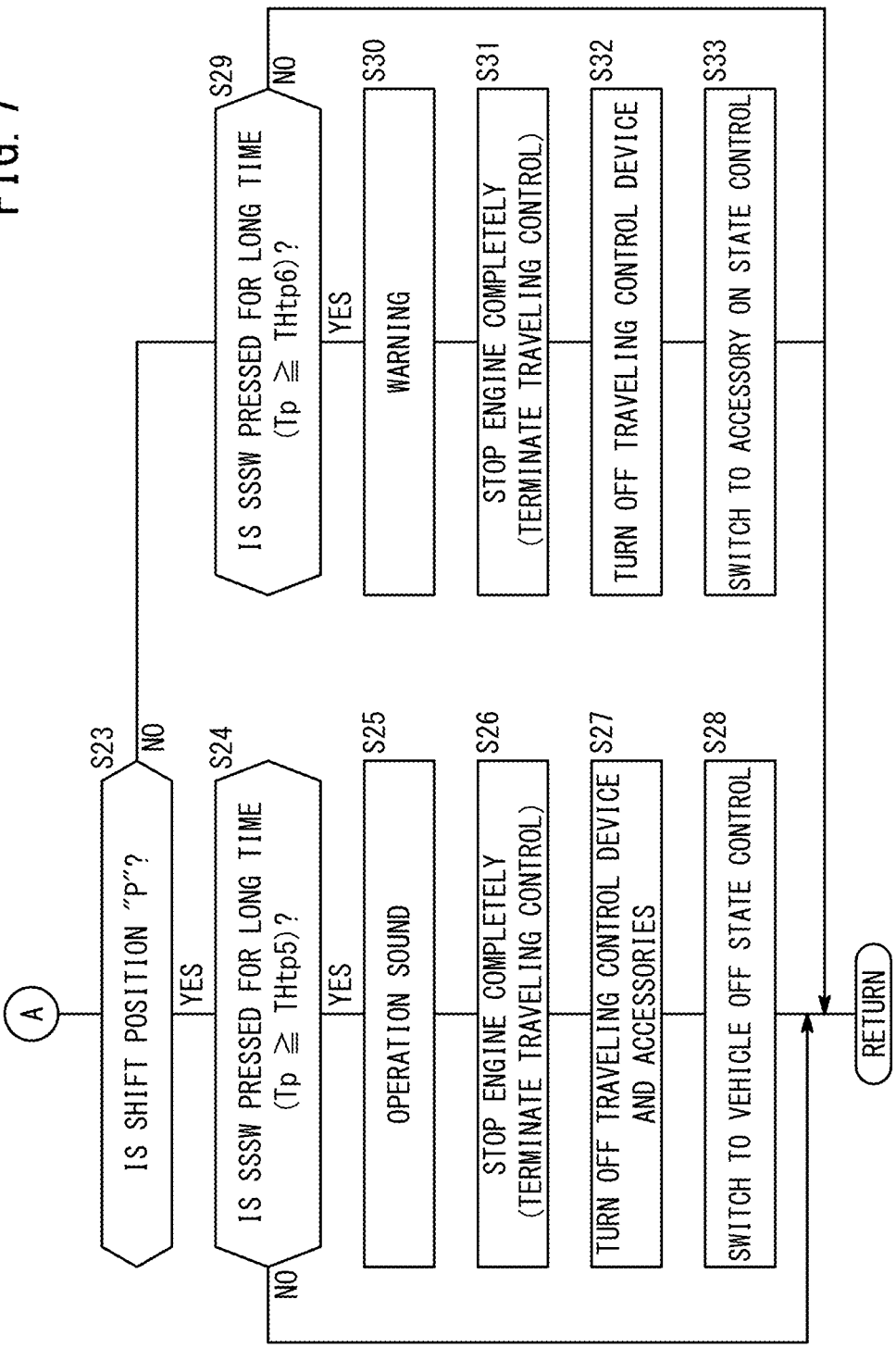
FIG. 7 is a second flowchart of a vehicle on state control in the present embodiment.

Next, in step S8, the PCU 66 switches from the vehicle off state control to the vehicle on state control (FIGS. 6 and 7). If the SSSW 64 has not been pressed for a short time (step S5: NO) or key authentication was unsuccessful (step S6: NO), the current process is terminated, and the process returns to step S1.

(A2-3. ACC on State Control)

Figure 5:
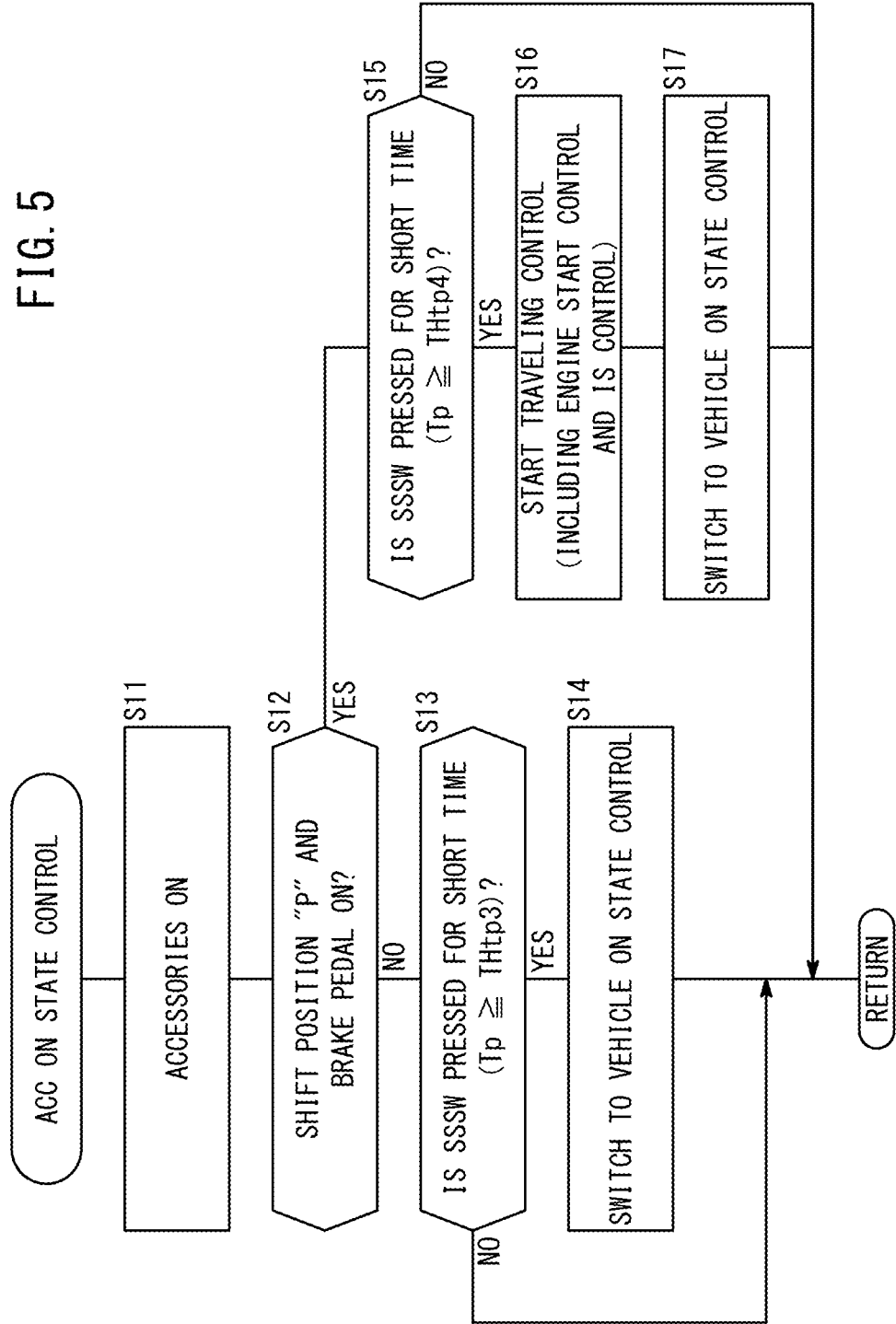
FIG. 5 is a flowchart of an accessory (ACC) on state control in the present embodiment.

FIG. 5 is a flowchart of an accessory (ACC) on state control in the present embodiment. In step S11, the PCU 66, by turning a non-illustrated on/off switch to on, supplies power to the accessories 24 from a non-illustrated low voltage battery. Consequently, the accessories 24 are turned on. In the event that step S11 is carried out in a state in which the accessories 24 are already on, the PCU 66 maintains the on state of the accessories 24.

In step S12, the PCU 66 judges whether or not the shift position Ps is "P" and the brake pedal 42 is on. In the case that the shift position Ps is not "P" or the brake pedal 42 is not on (step S11: NO), then the process proceeds to step S13.

In step S13, the PCU 66 judges whether or not the SSSW 64 has been pressed for a short time interval. More specifically, a judgment is made as to whether or not the pressing time Tp of the SSSW 64 is greater than or equal to a third time threshold THtp3 (hereinafter also referred to as a "third threshold THtp3" or a "threshold THtp3"). The third threshold THtp3 is a threshold value for determining that the SSSW 64 has been pressed for a short time, and for example, can be of any value from 10 to 90 milliseconds. The third threshold THtp3 may be the same length as one or both of the first and second thresholds THtp1, THtp2, or may be a different length than the first and second threshold values THtp1. THtp2.

If the SSSW 64 has been pressed for a short time (step S13: YES), then in step S14, the PCU 66 switches (situation 5 of FIG. 3) from the ACC on state control to the vehicle on state control (see, FIGS. 6 and 7). If the SSSW 64 has not been pressed for a short time (step S13: NO), the current process is terminated, and the process returns to step S11.

In step S12, if the shift position Ps is "P" and the brake pedal 42 is on (step S12: YES), then in step S15, the PCU 66 judges whether or not the SSSW 64 has been pressed for a short time. More specifically, a judgment is made as to whether or not the pressing time Tp of the SSSW 64 is greater than or equal to a fourth time threshold THtp4 (hereinafter also referred to as a "fourth threshold THtp4" or a "threshold THtp4"). The fourth threshold THtp4 is a threshold value for determining that the SSSW 64 has been pressed for a short time, and for example, can be of any value from 10 to 90 milliseconds. The fourth threshold THtp4 may be the same length as any or all of the first to third thresholds THtp1 through THtp3, or may be a different length than the first to third threshold values THtp1 through THtp3.

If the SSSW 64 has been pressed for a short time (step S15: YES), then in step S16, the PCU 66, similar to step S7 (see FIG. 4), initiates the traveling control, and starts the engine 18 (situation 1 of FIG. 3). Next, in step S17, the PCU 66 switches from the ACC on state control to the vehicle on state control (FIGS. 6 and 7). If the SSSW 64 has not been pressed for a short time (step S15: NO), the current process is terminated, and the process returns to step S11.

(A2-4. Vehicle on State Control)

FIGS. 6 and 7 are first and second flowcharts of a vehicle on state control in the present embodiment. When the vehicle on state control is initiated, the PCU 66 turns on the traveling control device (the engine ECU 16, the brake ECU 130, etc.) In step S21, the PCU 66 judges whether or not the engine 18 is in operation or is in an idle stop condition (in other words, whether or not the engine 18 is operating under the traveling control). If the engine 18 is in operation or is in an idle stop condition (step S21: YES), then in step S22, the PCU 66 judges whether or not the vehicle 10 is stopped. More specifically, the PCU 66 judges whether or not the vehicle velocity V from the vehicle velocity sensor 36 is zero. Alternatively, the PCU 66 may judge whether or not the vehicle 10 is currently stopped based on whether or not the vehicle velocity V is less than or equal to a predetermined vehicle velocity threshold THv2 (hereinafter referred to as a "threshold THv2").

If the vehicle 10 is currently stopped (step S22: YES), then in step S23 of FIG. 7, the PCU 66 judges whether or not the shift position Ps is "P" (park). If the shift position Ps is "P" (step S23: YES), then in step S24, the PCU 66 judges whether or not the SSSW 64 has been pressed for a long time. More specifically, a judgment is made as to whether or not the pressing time Tp of the SSSW 64 is greater than or equal to a fifth time threshold THtp5 (hereinafter also referred to as a "fifth threshold THtp5" or a "threshold THtp5"). The fifth threshold THtp5 is a threshold value for determining that the SSSW 64 has been pressed for a long time, and for example, can be of any value from 0.3 to 0.8 seconds. The fifth threshold THtp5 is greater than the first through fourth thresholds THtp1 to THtp4.

If the SSSW 64 has been pressed for a long time (step S24: YES), then in step S25, the PCU 66 outputs an operation sound via the speaker 72. The operation sound is a sound that notifies the user that the vehicle 10 is transitioning to the vehicle off state. The operation sound, for example, may be a simple electronic sound or voice guidance. In steps S26 and S27, the PCU 66 executes a normal stop control. More specifically, in step S26, the PCU 66 terminates the traveling control and completely stops the engine 18 (situation 2, situation 7 and situation 8 of FIG. 3). If the engine 18 currently is not under operation and is not in an idle stop condition (in other words, if the traveling control is not being carried out) (step S21: NO), then step S26 is omitted. In step S27, the PCU 66 turns off the traveling control device (the engine ECU 16, the brake ECU 130, etc.) and the accessories 24.

Generally, during starting (especially during cranking) of the engine 18, since a non-illustrated starter motor consumes a large amount of electric power, a portion of the vehicle mounted devices are stopped. However, since the PCU 66 remains operating, as shown in situations 7 and 8 of FIG. 3, it is possible to interrupt starting of the engine 18. If the vehicle 10 is a diesel engine vehicle rather than a gasoline engine vehicle, in addition to during cranking, during preheating (glow) or the like prior to cranking, it is possible to interrupt starting of the engine 18.

In step S28, the PCU 66 switches (situation 6 of FIG. 3) from the vehicle on state control to the vehicle off state control (see FIG. 4). If the SSSW 64 has not been pressed for a long time (step S24: NO), the current process is terminated, and the process returns to step S21. At this time, although the SSSW 64 is pressed, if the condition, step S24: YES, is not met since the pressing time Tp is short, in order to enable the vehicle 10 to be stopped, the PCU 66 may display on the MID 74 a notice to the effect that it is necessary to press the SSSW 64 for a long time.

Returning to step S23, if the shift position Ps is not "P" (step S23: NO), then in step S29, the PCU 66 judges whether or not the SSSW 64 has been pressed for a long time. More specifically, a judgment is made as to whether or not the pressing time Tp of the SSSW 64 is greater than or equal to a sixth time threshold THtp6 (hereinafter also referred to as a "sixth threshold THtp6" or a "threshold THtp6"). The sixth threshold THtp6 is a threshold value for determining that the SSSW 64 has been pressed for a long time, and for example, can be of any value from 0.3 to 0.8 seconds. The sixth threshold THtp6 is greater than the first through fourth thresholds THtp1 to THtp4. Further, the sixth threshold THtp6 may be the same length as the fifth threshold THtp5, or a different length than the fifth threshold THtp5.

If the SSSW 64 has been pressed for a long time (step S29: YES), then in step S30, the PCU 66 issues a warning. More specifically, the PCU 66 outputs a warning sound from the speaker 72. In step S31, the PCU 66 terminates the traveling control and completely stops the engine 18. If the engine 18 currently is not under operation and is not in an idle stop condition (in other words, if the traveling control is not being carried out) (step S21: NO), then step S31 is omitted. In step S32, the PCU 66 turns off the traveling control device (the engine ECU 16, the brake ECU 130, etc.). In step S33, the PCU 66 switches from the vehicle on state control to the ACC on state control (see FIG. 5).

If the SSSW 64 has not been pressed for a long time (step S29: NO), the current process is terminated, and the process returns to step S21. At this time, although the SSSW 64 is pressed, if the condition, step S29: YES, is not met since the pressing time Tp is short, then the PCU 66 may issue a warning similarly to step S30, and for enabling the vehicle 10 to be stopped, the PCU 66 may display on the MID 74 a notice to the effect that it is necessary to press the SSSW 64 for a long time.

Returning to step S22 of FIG. 6, if the vehicle 10 is currently not stopped (step S22: NO), the vehicle 10 is considered to be moving (|V|≠0). In this case, in step S34, the PCU 66 judges whether or not the SSSW 64 has been pressed for a very long time interval, and whether or not the SSSW 64 has been pressed a predetermined number of times in succession.

More specifically, the PCU 66 judges whether or not the pressing time Tp of the SSSW 64 is greater than or equal to a seventh time threshold THtp7 (hereinafter also referred to as a "seventh threshold THtp7" or a "threshold THtp7"). The seventh threshold THtp7 is a threshold value for determining that the SSSW 64 has been pressed for a very long time, and for example, can be of any value from 1.2 to 1.8 seconds. The seventh threshold THtp7 is greater than the first through sixth thresholds THtp1 to THtp6.

Further, the PCU 66 determines whether or not the number of pressing times Np of the SSSW 64 has exceeded a number of times threshold THnp (hereinafter also referred to as a "threshold THnp"). When the pressing time Tp of the SSSW 64 becomes greater than or equal to an eighth time threshold THtp8 (hereinafter also referred to as a "eighth threshold THtp8" or a "threshold THtp8"), the count value of the number of pressing times Np is incremented by "+1". Thereafter, if the SSSW 64 is pressed again after having been released, the count is restarted. The eighth threshold THtp8 is a threshold value for determining that the SSSW 64 has been pressed for a short time, and for example, can be of any value from 10 to 90 milliseconds. The eighth threshold THtp8 may be the same length as any or all of the first to fourth thresholds THtp1 through THtp4, or may be a different length than the first to fourth thresholds THtp1 through THtp4. Further, the eighth threshold THtp8 is smaller than the fifth through seventh thresholds THtp5 to THtp7.

Further, in the present embodiment, the number of times threshold THnp is 3. Alternatively, the number of times threshold THnp may be of a different value (for example, 2, 4, or 5).

During the determination that is carried out in step S34, the PCU 66 causes the internal light source 90 of the SSSW 64 to flash (details thereof will be described later with reference to FIGS. 9 and 10). Further, only one of the judgments may be made, as to whether the SSSW 64 has been pressed for a very long time interval, or whether the SSSW 64 has been pressed a predetermined number of times in succession.

If the SSSW 64 has been pressed for a very long time or has been pressed a predetermined number of times in succession (step S34: YES), then in step S35, the PCU 66 outputs an operation sound via the speaker 72. As noted above, the operation sound is a sound that notifies the user that the vehicle 10 is transitioning to the vehicle off state. In step S36, the PCU 66 executes an emergency stop control (situation 3 of FIG. 3). For example, the PCU 66 causes the vehicle 10 to decelerate continuously and come to a stop. Further, when the vehicle 10 has stopped, the traveling control device and the accessories 24 are turned off.

If the SSSW 64 has not been pressed for a very long time and has not been pressed a predetermined number of times in succession (step S34: NO), the current process is terminated, and the process returns to step S21. At this time, although the SSSW 64 is pressed, if the condition, step S34: YES, is not met since the pressing time Tp is short, in order to enable the vehicle 10 to be stopped, the PCU 66 may display on the MID 74 a notice to the effect that it is necessary to press the SSSW 64 for a very long time or the predetermined number of times in succession.

Returning to step S21, in the case that the engine 18 is not under operation and the vehicle 10 is not in an idle stop condition (step S21: NO), in step S37, the PCU 66 judges whether or not the shift position Ps is "P" and the brake pedal 42 is on. In the case that the shift position Ps is not "P" or the brake pedal 42 is not on (step S37: NO), then the process proceeds to step S23 of FIG. 7.

If the shift position Ps is "P" and the brake pedal 42 is on (step S37: YES), then in step S38, the PCU 66 judges whether or not the SSSW 64 has been pressed for a short time. More specifically, a judgment is made as to whether or not the pressing time Tp of the SSSW 64 is greater than or equal to a ninth time threshold THtp9 (hereinafter also referred to as a "ninth threshold THtp9" or a "threshold THtp9"). The ninth threshold THtp9 is a threshold value for determining that the SSSW 64 has been pressed for a short time, and for example, can be of any value from 10 to 90 milliseconds. The ninth threshold THtp9 may be the same length as any or all of the first to fourth and the eighth thresholds THtp1 through THtp4, THtp8, or may be a different length than the first to fourth and the eighth thresholds THtp1 through THtp4, THtp8. Further, the ninth threshold THtp9 is smaller than the fifth through seventh thresholds THtp5 to THtp7.

If the SSSW 64 has been pressed for a short time (step S38: YES), then in step S39, in the same manner as in step S7 of FIG. 4 and step S16 of FIG. 5, the PCU 66 initiates the traveling control, and starts the engine 18 (situation 1 of FIG. 3). If the SSSW 64 has not been pressed for a short time (step S38: NO), the current process is terminated, and the process returns to step S21.

(A2-5. When Switching Occurs from the Vehicle on State Control to the Vehicle Off State Control)

Next, a detailed description will be presented concerning the time that switching takes place from the vehicle on state control to the vehicle off state control.

(A2-5-1. In a Case where the SSSW 64 is Pressed for a Long Time Period (Step S24: YES or Step S29: YES in FIG. 7))

Figure 8:
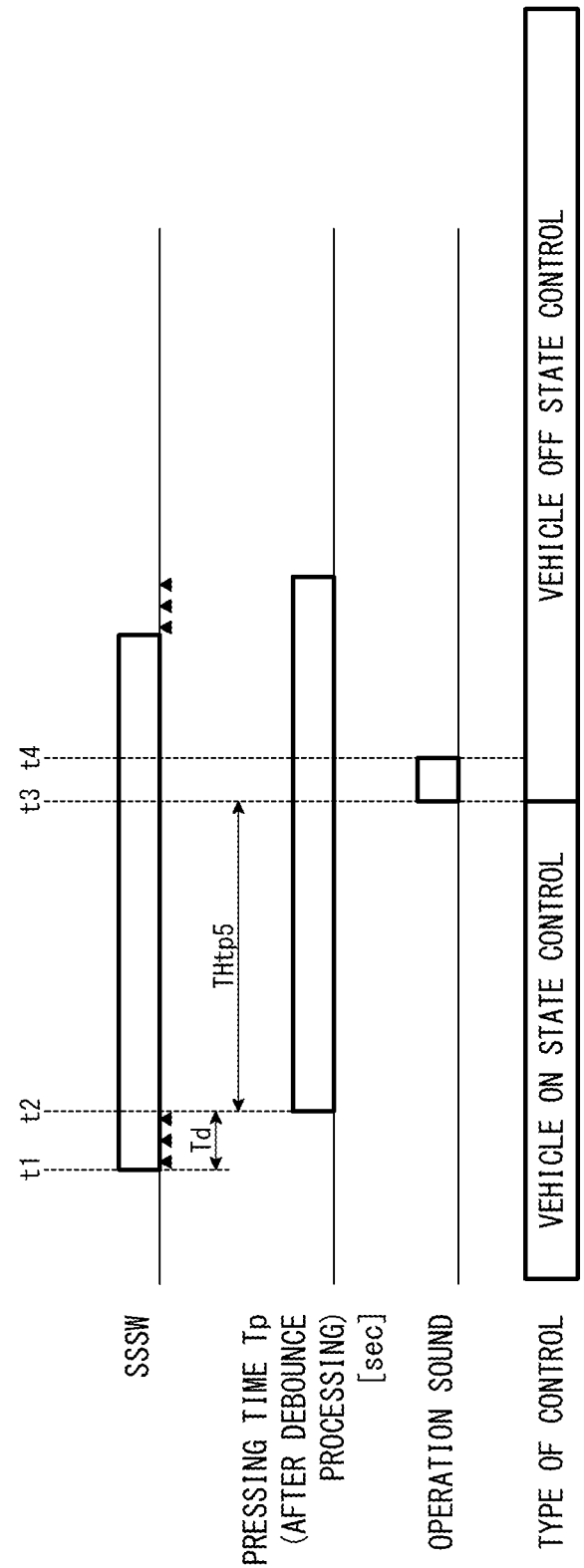
FIG. 8 is a time chart showing a first example in the present embodiment, in which switching is performed from the vehicle on state control to the vehicle off state control.

FIG. 8 is a time chart showing a first example in the present embodiment, in which switching is performed from the vehicle on state control to the vehicle off state control. More specifically, FIG. 8 is a time chart showing an example in which the SSSW 64 is pressed for a long time (step S24: YES) in the case that the engine 18 is under operation or is in an idle stop condition (stated otherwise, the engine ECU 16 is executing the traveling control) (step S21 of FIG. 6: YES), the vehicle 10 is currently stopped (step S22: YES), and the shift position is "P" (step S23 of FIG. 7: YES). Instead of step S24 of FIG. 7, in the case of step S29 as well, a time chart similar to that of FIG. 8 can be used.

In FIG. 8, initially, the vehicle on state control is executed. At time t1, the user starts to press the SSSW 64. At time t2 at which a predetermined time Td has elapsed from the start of pressing (t1), the PCU 66 begins measurement of the pressing time Tp. Stated otherwise, the predetermined time Td is a time to perform so-called debounce processing. Debounce processing is a process for removing the influence of noise, by canceling repetition (debouncing) of on and off occurrences of the SSSW 64, which are generated when the SSSW 64 starts to be pressed. Debouncing also occurs when pressing of the SSSW 64 is ended. Debouncing occasionally is also referred to as chattering. The plural small triangles shown in FIG. 8 (as well as FIGS. 9 and 10) indicate the occurrence of debouncing.

When time t3 is reached, the pressing time Tp becomes greater than or equal to the fifth threshold THtp5. Thus, the PCU 66 judges that the SSSW 64 has been pressed for a long time (step S24 of FIG. 7: YES) and outputs the operation sound from the speaker 72 until time t4 (step S25). Further, since the shift position Ps is "P" (step S23: YES), at time t3, the PCU 66 switches from the vehicle on state control to the vehicle off state control (step S28). Further, in the case that the shift position Ps is not "P" (step S23: NO), at time t3, the PCU 66, after having issued a warning (step S30), switches from the vehicle on state control to the ACC on state control (step S33).

(A2-5-2. In a Case where the SSSW 64 is Pressed for a Very Long Time Period (Step S34: YES in FIG. 6))

Figure 9:
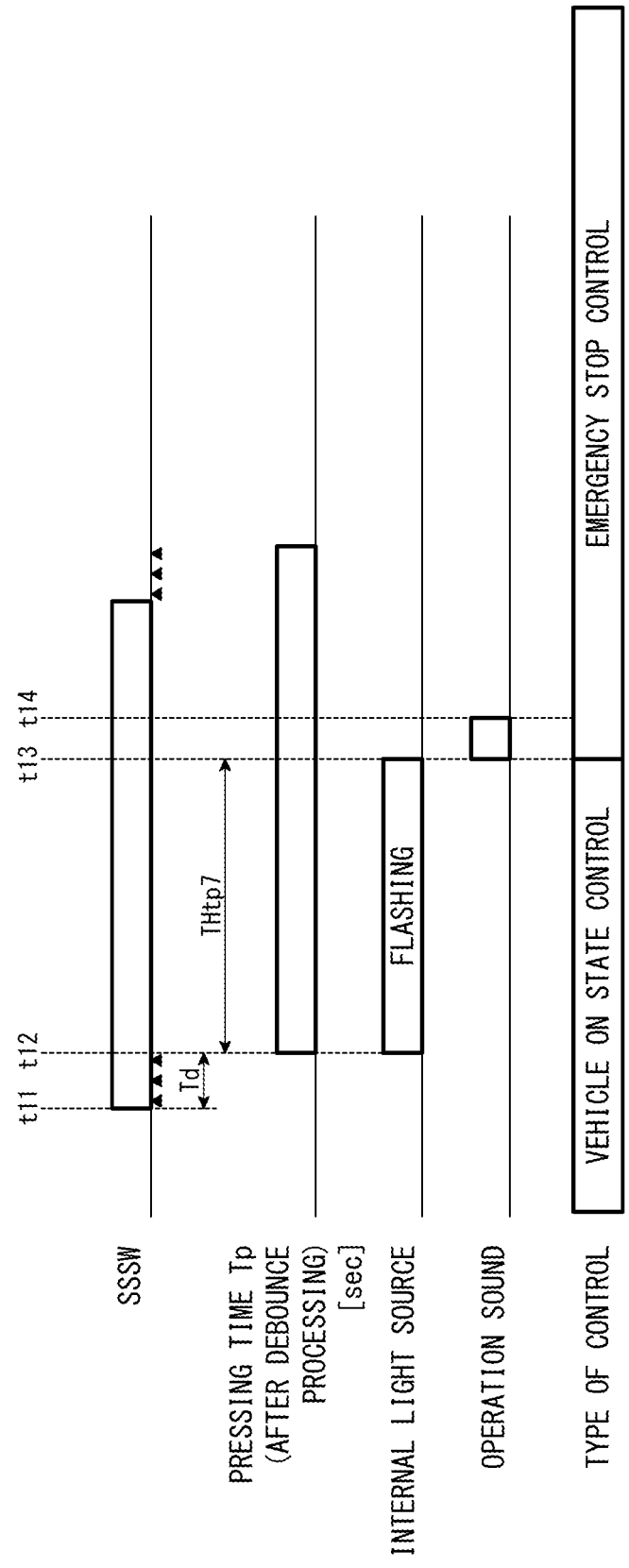
FIG. 9 is a time chart showing a second example in the present embodiment, in which switching is performed from the vehicle on state control to the vehicle off state control.

FIG. 9 is a time chart showing a second example in the present embodiment, in which switching is performed from the vehicle on state control to the vehicle off state control. More specifically, FIG. 9 is a time chart showing an example in which the SSSW 64 is pressed for a very long time (step S34: YES) in the case that the engine 18 is under operation or is in an idle stop condition (stated otherwise, the engine ECU 16 is executing the traveling control) (step S21 of FIG. 6: YES) and the vehicle 10 is currently not stopped (step S22: NO). In the example of FIG. 9, the vehicle transitions to the vehicle off control state via the emergency stop control.

In FIG. 9, initially, the vehicle on state control is executed. At time t11, the user starts to press the SSSW 64. At time t12 at which a predetermined time Td has elapsed from the start of pressing (t11), the PCU 66 begins measurement of the pressing time Tp. Stated otherwise, the predetermined time Td is a time to perform the aforementioned debounce processing. Further, at time t12, the PCU 66 initiates flashing of the internal light source 90 of the SSSW 64. At this time, the SSSW 64 flashes with a relatively conspicuous color (e.g., red).

When time t13 is reached, the pressing time Tp becomes greater than or equal to the seventh threshold THtp7. Thus, the PCU 66 judges that the SSSW 64 has been pressed for a very long time (step S34 of FIG. 6: YES) and outputs the operation sound from the speaker 72 until time t14 (step S35). Further, at time t13, the PCU 66 terminates flashing of the internal light source 90 of the SSSW 64. Furthermore, at time t13, the PCU 66 switches from the vehicle on state control to the emergency stop control (step S36). In the emergency stop control, the PCU 66 causes the vehicle 10 to decelerate continuously and come to a stop. When the vehicle 10 is stopped, the vehicle 10 is placed in the vehicle off state control.

(A2-5-3. In a Case where the SSSW 64 is Pressed a Predetermined Number of Times in Succession (Step S34: YES in FIG. 6))

Figure 10:
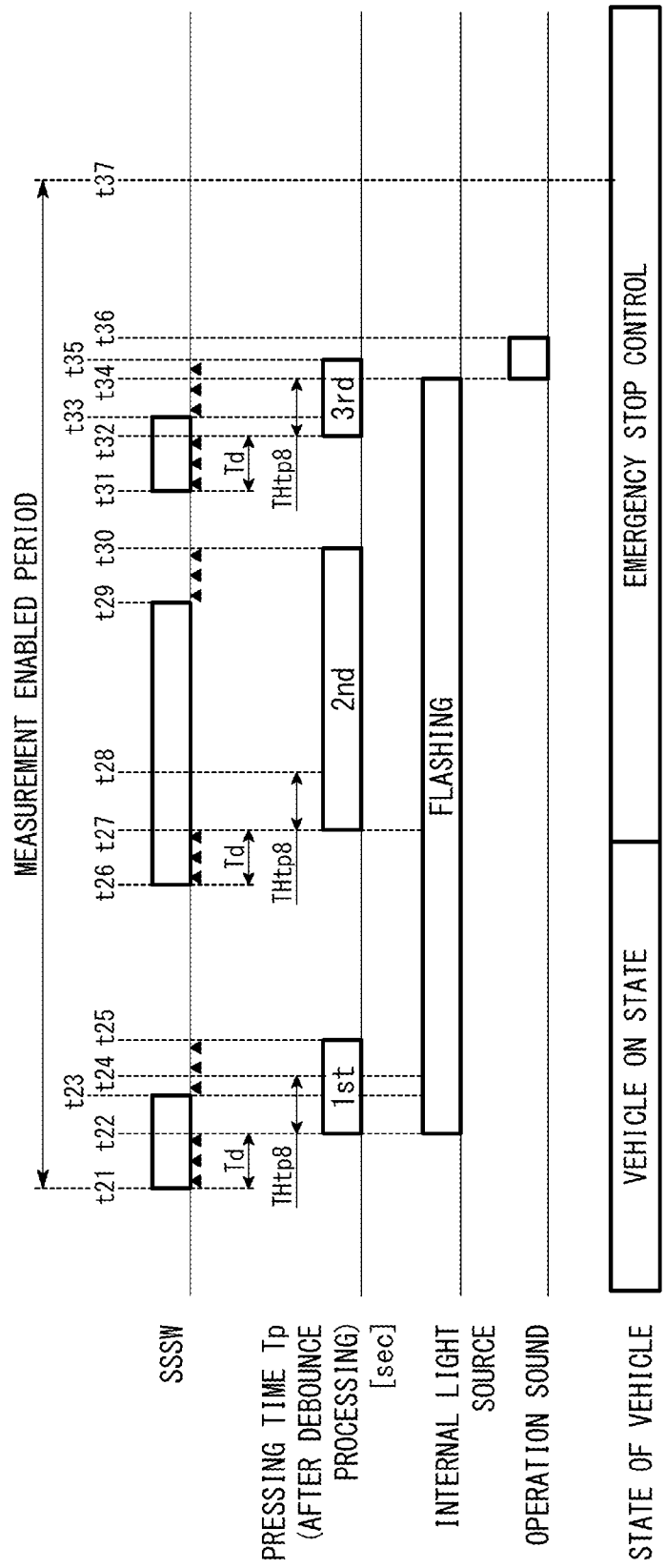
FIG. 10 is a time chart showing a third example in the present embodiment, in which switching is performed from the vehicle on state control to the vehicle off state control.

FIG. 10 is a time chart showing a third example in the present embodiment, in which switching is performed from the vehicle on state control to the vehicle off state control. More specifically, FIG. 10 is a time chart showing an example in which the SSSW 64 is pressed a predetermined number of times in succession (step S34: YES) in the case that the engine 18 is under operation or is in an idle stop condition (stated otherwise, the engine ECU 16 is executing the traveling control) (step S21 of FIG. 6: YES) and the vehicle 10 is currently not stopped (step S22: NO). In the example of FIG. 10, the vehicle transitions to the vehicle off control state via the emergency stop control.

In FIG. 10, initially, the vehicle on-state control is executed. At time t21, the user starts to press the SSSW 64. At time t22 at which a predetermined time Td has elapsed from the start of pressing (t21), the PCU 66 begins measurement of the pressing time Tp. Stated otherwise, the predetermined time Td is a time to perform the aforementioned debounce processing. Further, at time t22, the PCU 66 initiates flashing of the internal light source 90 of the SSSW 64. At this time, the SSSW 64 flashes with a relatively conspicuous color (e.g., red).

When time t24 is reached, the pressing time Tp becomes greater than or equal to the eighth threshold THtp8. Thus, the PCU 66 judges that the SSSW 64 has been pressed for a short time, and the number of pressing times Np is incremented by "+1" to become "1". At time t23, if the user releases the SSSW 64 once, then at time t25, the PCU 66 determines that the SSSW 64 has been released, and resets the pressing time Tp.

Between the period from time t26 to time t34, the number of pressing times Np is measured in a similar manner. More specifically, at time t26, the user resumes pressing of the SSSW 64. At time t27 at which a predetermined time Td has elapsed from resumption of pressing (t26), the PCU 66 resumes measurement of the pressing time Tp. When time t28 is reached, the pressing time Tp becomes greater than or equal to the eighth threshold THtp8. Thus, the PCU 66 judges that the SSSW 64 has been pressed another time, and the number of pressing times Np is incremented by "+1" to become "2". At time t29, if the user releases the SSSW 64 once, then at time t30, the PCU 66 determines that the SSSW 64 has been released, and resets the pressing time Tp.

At time t31, the user resumes pressing of the SSSW 64. At time t32 at which a predetermined time Td has elapsed from resumption of pressing (t31), the PCU 66 resumes measurement of the pressing time Tp. When time t34 is reached, the pressing time Tp becomes greater than or equal to the eighth threshold THtp8. Thus, the PCU 66 judges that the SSSW 64 has been pressed another time, and the number of pressing times Np is incremented by "+1" to become "3". Consequently, since the number of pressing times Np has become greater than or equal to the threshold THtp (=3), the PCU 66 judges that the SSSW 64 has been pressed a predetermined number of times in succession (step S34 of FIG. 6: YES) and outputs the operation sound from the speaker 72 until time t36 (step S35). Further, at time t34, the PCU 66 terminates flashing of the internal light source 90 of the SSSW 64. Furthermore, at time t32, the PCU 66 switches from the vehicle on state control to the emergency stop control (step S35).

The judgment of the number of pressing times Np is carried out within a predetermined measurement enabled period (from time t21 to time t37), and if the measurement enabled period is exceeded, the number of pressing times Np is reset. The measurement enabled period starts from time t21 at which pressing of the SSSW 64 has started, without regard to the debounce processing. However, the measurement enabled period may be started from a different point in time (for example, at time t22 when the debounce processing is started.)

[A3. Advantages of the Present Embodiment]

As has been described above, according to the present embodiment, when the vehicle 10 is in a non-traveling condition, the operating method by the SSSW 64 (push switch) in the case that the engine 18 (drive source) or the vehicle mounted device (engine ECU 16, brake ECU 130, accessories 24, etc.) is switched from off to on (step S4 of FIG. 4 (and step S11 of FIG. 5), steps S7, S8 of FIG. 4, steps S14, S16, S17 of FIG. 5, step S39 of FIG. 6), is set to be different from the operating method by the SSSW 64 in the case that the engine 18 or the vehicle mounted device is switched from on to off (steps S26 to S28, steps S31 to S33 of FIG. 7) (see FIGS. 3 through 8). Therefore, even though both the on operation and the off operation are carried out by way of a pressing operation with respect to the same SSSW 64, it is required for the vehicle occupant to perform intentionally different operations by the on operation and the off operation. Consequently, with the present invention, the occurrence of mistaken operations performed with respect to the SSSW 64 can be reduced.

In the present embodiment, an operation confirmation time (fifth and sixth thresholds THtp5, THtp6) of the SSSW 64 in the case that the PCU 66 (switching control device) switches the engine 18 (drive source) or the vehicle mounted device (engine ECU 16, brake ECU 130, accessories 24, etc.) from on to off is set to be longer than an operation confirmation time (first through fourth and ninth thresholds THtp1 to THtp4, THtp9 of steps S2, S5, S13, S15, S38) of the SSSW 64 in the case that the PCU 66 (switching control device) switches the engine 18 or the vehicle mounted device from off to on (see FIGS. 3 to 8). Consequently, while ensuring operability of the on operation, by making it more difficult to turn off the power source by a mistaken operation in relation to the off operation, convenience can be enhanced together with preventing the occurrence of mistaken operations.

In the present embodiment, the vehicle control device 14 comprises the speaker 72 (sound generating device) that produces an operation sound responsive to operation of the SSSW 64 (push switch) (see FIG. 1). The PCU 66 (switching control device) causes the operation sound (including a warning) to be produced by the speaker 72, in the case that the engine 18 or the vehicle mounted device (engine ECU 16, brake ECU 130, accessories 24) is switched from on to off (steps S25, S30 of FIG. 7 and FIG. 8).

For example, in the case that the vehicle occupant operates the SSSW 64 by mistake when the engine 18 is stopped by an idle stop while the vehicle 10 is stationary, a condition may be contemplated in which the power source of the vehicle 10 is turned off. Even if such a condition occurs, in accordance with the configuration described above, the fact that the vehicle occupant has performed an operation to turn off the power source can be recognized by the operation sound, and therefore, such an erroneous operation is easily noticed.

In the present embodiment, in the case that the engine 18 or the vehicle mounted device (engine ECU 16, brake ECU 130, accessories 24, etc.) is switched from on to off, the PCU 66 (switching control device) causes the operation sound to be produced by the speaker 72 (sound generating device) when operation of the SSSW 64 is finalized (steps S25, S30 of FIG. 7 and FIG. 8). In accordance with this feature, inconvenience is reduced as compared to a case where the operation sound is generated before the operation of the SSSW 64 is finalized, and it is also possible to securely notify the vehicle occupant that the off operation has been performed.

In the present embodiment, the hazard switch 100 (another switch) on which a pressing operation can be performed is disposed in the vicinity of the SSSW 64 (push switch) (see FIG. 2). The SSSW 64 is arranged farther from an occupant who is seated in a driver's seat than the hazard switch 100 in the longitudinal direction of the vehicle 10 (see FIG. 2). Thus, even though the hazard switch 100, which is similar to the SSSW 64, is disposed in the vicinity of the SSSW 64, the possibility for a mistaken operation of the SSSW 64 can further be reduced.

In the present embodiment, the hazard switch 100 (another switch) on which a pressing operation can be performed is disposed in the vicinity of the SSSW 64 (push switch) (see FIG. 2). The SSSW 64 and the hazard switch 100 are of different colors on surfaces (or pressing surfaces) thereof that are viewed by a vehicle occupant. Thus, even though the hazard switch 100, which is similar to the SSSW 64, is disposed in the vicinity of the SSSW 64, the possibility for a mistaken operation of the SSSW 64 can further be reduced.

In the present embodiment, the SSSW 64 (push switch) is arranged at a position that can be viewed on an inner side of a steering wheel 82, from the perspective of an occupant who is seated in a driver's seat (see FIG. 2). Further, the hazard switch 100 (another switch) is arranged at a position that can be viewed on an outer side of the steering wheel 82, from the perspective of the occupant who is seated in the driver's seat (see FIG. 2). Thus, even though the hazard switch 100, which is similar to the SSSW 64, exists in the vicinity of the SSSW 64, the possibility for a mistaken operation of the SSSW 64 can further be reduced.

In the present embodiment, the surface color of the hazard switch 100 is red, and the surface color of the SSSW 64 (push switch) is a color other than red. In accordance with this feature, by providing the hazard switch 100, which has a high possibility of being operated during traveling, with the most prominent color (red), the possibility for mistaken operation of the SSSW 64 during traveling of the vehicle can further be reduced.

In the present embodiment, the vehicle control device 14 comprises the MID 74 (notification device) that notifies the user (vehicle occupant) concerning the operation method of the SSSW 64 (push switch) responsive to an operation that is carried out with respect to the SSSW 64 (see FIG. 1). In the case that the push switch SSSW 64 is operated when the engine 18 (drive source) or the vehicle mounted device is on, the PCU 66 (switching control device) can notify to the MID 74 the operation method for switching the engine 18 or the vehicle mounted device from on to off (step S24: NO and step S29: NO of FIG. 7). Owing thereto, the operation method is made clear even to a vehicle occupant who is not familiar with operation of the SSSW 64, thus enhancing convenience to the occupant.

B. Modifications

The present invention is not limited to the above embodiment, and various arrangements may be adopted therein based on the descriptive content of the present specification. For example, the present invention may adopt the following alternative arrangements.

[B1. Objects in which Vehicle Control Device is Incorporated]

In the above embodiment, the vehicle 10 is a gasoline vehicle. However, the vehicle 10 may be a diesel engine vehicle or an electric vehicle (including a hybrid vehicle or a fuel cell vehicle). In the case that the vehicle 10 is an electric vehicle, the object to be controlled by the PCU 66 includes a traction motor, for example, rather than the engine 18 or in addition to the engine 18.

In the case of a hybrid vehicle, a state in which the engine 18 is not activated, and thus traveling is enabled solely by the traction motor, corresponds to the condition that occurs during an idle stop while the traveling control is being implemented. Further, in the case of an electric vehicle in which the drive source is provided solely by a traction motor, the state in which the traction motor is being driven can be set to correspond with the condition in the above embodiment in which the engine 18 is under operation, whereas the state in which the traction motor is currently stopped can be set to correspond with the idle stop condition. Furthermore, if the vehicle 10 is a fuel cell vehicle, a start/stop control for a fuel cell system may be employed rather than the start/stop control for the engine 18.

Although in the above-described embodiment, the control device 14 is installed in the vehicle 10, the invention is not limited to this feature, and the control device 14 may be installed in other objects. For example, the control device 14 can be used in mobile objects such as ships, aircraft, and the like.

[B2. Vehicle Control Device 14]

According to the above embodiment, the color of the SSSW 64 differs from the color of the hazard switch 100 (see FIG. 2). However, for example, insofar as the off operation and the on operation on the SSSW 64 differ from each other, the invention is not limited to this feature, and both colors may be the same.

According to the above embodiment, the SSSW 64 is disposed more on a rearward side than the hazard switch 100 (see FIG. 2). However, for example, insofar as the off operation and the on operation on the SSSW 64 differ from each other, the invention is not limited to this feature, and the SSSW 64 may be disposed more on the frontward side than the hazard switch 100.

In the above embodiment, the SSSW 64 is arranged at a position that can be viewed on an inner side of a steering wheel 82, from the perspective of a user (occupant) who is seated in a driver's seat (see FIG. 2). Stated otherwise, a user who is seated in the driver's seat can view the SSSW 64 through an opening formed in the steering wheel 82. Further, the hazard switch 100 is arranged at a position that can be viewed on an outer side of a steering wheel 82, from the perspective of the user (occupant) who is seated in a driver's seat (see FIG. 2). Stated otherwise, the user who is seated in the driver's seat can view the hazard switch 100 on the outer side of the steering wheel 82. However, for example, insofar as the off operation and the on operation on the SSSW 64 differ from each other, the invention is not limited to this feature. For example, the SSSW 64 and the hazard switch 100 may be arranged at positions such that the user who is seated in the driver's seat is capable of viewing both the SSSW 64 and the hazard switch 100 on the outer side of the steering wheel 82.

According to the above embodiment, the SSSW 64 is disposed in the vicinity of the hazard switch 100 (see FIG. 2). However, the SSSW 64 may be arranged in the vicinity of another switch instead of the hazard switch 100. As the other switch, there may be included, for example, a fuel savings mode switch 140 (see FIG. 2) that places the vehicle 10 in a fuel savings mode. Alternatively, the SSSW 64 can be disposed remotely from the other switches.

In the above-described embodiment, the MID 74 is used as a notification device for notifying the user (vehicle occupant) concerning the operation method for the SSSW 64 (see FIG. 1). However, for example, from the standpoint of notifying the user (vehicle occupant) of the operation method for the SSSW 64, the invention is not limited to this feature. For example, the speaker 72 can be used as a notification device.

[B3. Switching Control]

With the above-described embodiment, as objects to be switched by the PCU 66, there have been presented the vehicle off state, the ACC on state, and the vehicle on state (see FIGS. 4 to 8). However, for example, insofar as the off operation and the on operation on the SSSW 64 differ from each other, the invention is not limited to this feature. For example, a switching control may be applied only to a combination of the vehicle off state and the ACC on state, or only to a combination of the vehicle off state and the vehicle on state.

According to the above embodiment, the conditions of steps S24 and S29 of FIG. 7 are set by the pressing time Tp. However, for example, from the standpoint of switching from the vehicle on state control to the vehicle off state control or the ACC on state control, the invention is not limited by this feature. For example, in steps S24 and S29 of FIG. 7, the fact that the number of pressing times Np of the SSSW 64 has become greater than or equal to a second number of times threshold THnp2 (e.g., 2 or 3) can be used in addition to or instead of the pressing time Tp.

With the above embodiment, the fact that the shift position Ps is "P" (park) is used as a starting condition for the engine 18 (or a starting condition for the traveling control), or as a confirmation that the vehicle 10 is in a parked state (step S1 of FIG. 4, step S12 of FIG. 5, step S37 of FIG. 6, step S23 of FIG. 7). In place thereof, the fact that the parking brake 134 is on can be used, based on a detection result of the PB sensor 136. Alternatively, in the event that the vehicle 10 is a manual transmission vehicle, the fact that a non-illustrated clutch pedal is on may be used as the starting condition for the engine 18 (or the starting condition for the traveling control).

According to the above embodiment, the fifth threshold THtp5, which is used for the off operation in step S24 of FIG. 7, was set to be longer than the first through fourth time thresholds THtp1 to Thtp4, which are used for the on operation in steps S2. S5 of FIG. 4 and steps S13, S15 of FIG. 5 (see FIGS. 3 and 8). However, for example, insofar as attention is paid to the sixth threshold THtp6 in step S29 of FIG. 7 or the seventh threshold THtp7 in step S34 of FIG. 6, both of which are used for the off operation, the invention is not necessarily limited to this feature. For example, the fifth threshold Thtp5 can be of the same length as the first through fourth time thresholds THtp1 to Thtp4. In this case, the sixth threshold THtp6 (step S29) is set to be greater than the first through fifth time thresholds THtp1 to THtp5.

The fifth threshold THtp5 (step S24 of FIG. 7) is used in the case that the shift position Ps is "P" (step S23: YES). If the shift position Ps is set to "P" (park), it can be assumed that there is a high possibility for the user to intentionally perform the off operation. Therefore, as noted above, it is possible to ensure operability in such a situation. Alternatively, instead of the shift position Ps, the detection result of the PB sensor 136 (whether or not the parking brake 134 is on) can be used in a similar manner.

In the above-described embodiment, the operation sound (including a warning) is output if the off operation is finalized (step S35 of FIG. 6, steps S25, S30 of FIG. 7). However, for example, insofar as the off operation and the on operation on the SSSW 64 differ from each other, the invention is not limited to this feature. For example, the operation sound may be output or the operation sound may not be output each time that the SSSW 64 is pressed. Alternatively, the operation sound can be output when the on operation is finalized.

What is claimed is:

1. A vehicle control device comprising:
   a push switch disposed in an interior of a vehicle and on which a pressing operation can be performed by an occupant; and
   a switching control device that performs a switching control for switching an operating state of a drive source of the vehicle or a power supply state to a vehicle mounted device of the vehicle, corresponding to the pressing operation carried out with respect to the push switch,
   wherein
   in a case that the vehicle is in a non-traveling condition, the switching control device causes an operating method for the pressing operation, which is carried out with respect to the push switch for effecting the switching control, in a case that the drive source or the vehicle mounted device of the vehicle is switched from off to on, to be different from an operating method for the pressing operation in a case that the drive source or the vehicle mounted device of the vehicle is switched from on to off; and
   the switching control device sets an operation confirmation time of the push switch in the case that the drive source or the vehicle mounted device of the vehicle is switched from on to off to be longer than the operation confirmation time of the push switch in the case that the drive source or the vehicle mounted device of the vehicle is switched from off to on.

2. The vehicle control device according to claim 1, wherein:
   the vehicle control device further comprises a sound generating device that produces a sound responsive to operation of the push switch; and
   the switching control device causes the sound to be produced by the sound generating device in the case that the drive source or the vehicle mounted device of the vehicle is switched from on to off.

3. The vehicle control device according to claim 2, wherein, in the case that the drive source or the vehicle mounted device of the vehicle is switched from on to off, the switching control device causes the sound to be produced by the sound generating device when the operation of the push switch is finalized.

4. The vehicle control device according to claim 1, wherein:
   another switch on which a pressing operation can be performed is disposed in vicinity of the push switch; and
   the push switch is arranged farther from the occupant who is seated in a driver's seat than the other switch in a longitudinal direction of the vehicle.

5. The vehicle control device according to claim 1, wherein:
   another switch on which a pressing operation can be performed is disposed in vicinity of the push switch;
   the push switch is arranged at a position that can be viewed on an inner side of a steering wheel that is mounted in the vehicle, from a perspective of the occupant who is seated in a driver's seat; and
   the other switch is arranged at a position that can be viewed on an outer side of the steering wheel, from the perspective of the occupant who is seated in the driver's seat.

6. The vehicle control device according to claim 1, wherein:
   another switch on which a pressing operation can be performed is disposed in vicinity of the push switch; and
   the push switch and the other switch are of different colors on surfaces thereof that are viewed by the occupant.

7. The vehicle control device according to claim 6, wherein the other switch is a hazard switch configured to illuminate a hazard lamp of the vehicle, the surface color of the hazard switch being red, and the surface color of the push switch being a color other than red.

8. The vehicle control device according to claim 1, wherein:
   the vehicle control device further comprises a notification device that notifies the occupant concerning the operation method of the push switch responsive to the operation that is carried out with respect to the push switch; and
   in a case that the push switch is operated when the drive source or the vehicle mounted device of the vehicle is on, the switching control device notifies to the notification device the operation method for switching the drive source or the vehicle mounted device of the vehicle from on to off.

9. A vehicle control device comprising:
   a push switch disposed in an interior of a vehicle and on which a pressing operation can be performed by an occupant; and
   a switching control device that performs a switching control for switching an operating state of a drive source of the vehicle or a power supply state to a vehicle mounted device of the vehicle, corresponding to the pressing operation carried out with respect to the push switch,
   wherein
   in a case that the vehicle is in a non-traveling condition, the switching control device causes an operating method for the pressing operation, which is carried out with respect to the push switch for effecting the switching control, in a case that the drive source or the vehicle mounted device of the vehicle is switched from off to on, to be different from an operating method for the pressing operation in a case that the drive source or the vehicle mounted device of the vehicle is switched from on to off;
   when a shift position of the vehicle is in park, the switching control device sets an operation confirmation time of the push switch to be same in the case that the drive source or the vehicle mounted device of the vehicle is switched from off to on, and in the case that the drive source or the vehicle mounted device of the vehicle is switched from on to off; and when the shift position of the vehicle is not in park, the switching control device sets the operation confirmation time of the push switch in the case that the drive source or the vehicle mounted device of the vehicle is switched from on to off to be longer than the operation confirmation time of the push switch in the case that the drive source or the vehicle mounted device of the vehicle is switched from off to on.

10. A vehicle control device comprising:

a push switch disposed in an interior of a vehicle and on which a pressing operation can be performed by an occupant; and a switching control device that performs a switching control for switching an operating state of a drive source of the vehicle or a power supply state to a vehicle mounted device of the vehicle, corresponding to the pressing operation carried out with respect to the push switch, wherein in a case that the vehicle is in a non-traveling condition, the switching control device causes an operating method for the pressing operation, which is carried out with respect to the push switch for effecting the switching control, in a case that the drive source or the vehicle mounted device of the vehicle is switched from off to on, to be different from an operating method for the pressing operation in a case that the drive source or the vehicle mounted device of the vehicle is switched from on to off;

when a parking brake is on, the switching control device sets an operation confirmation time of the push switch to be same in the case that the drive source or the vehicle mounted device of the vehicle is switched from off to on, and in the case that the drive source or the vehicle mounted device of the vehicle is switched from on to off; and when the parking brake is not on, the switching control device sets the operation confirmation time of the push switch in the case that the drive source or the vehicle mounted device of the vehicle is switched from on to off to be longer than the operation confirmation time of the push switch in the case that the drive source or the vehicle mounted device of the vehicle is switched from off to on.

* * * * *